(12) United States Patent
Herrera-Alonso et al.

(10) Patent No.: US 7,771,824 B2
(45) Date of Patent: *Aug. 10, 2010

(54) BRIDGED GRAPHITE OXIDE MATERIALS

(75) Inventors: Margarita Herrera-Alonso, Princeton, NJ (US); Michael J. McAllister, Princeton, NJ (US); Ilhan A. Aksay, Princeton, NJ (US); Robert K. Prud'homme, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/204,292

(22) Filed: Sep. 4, 2008

(65) Prior Publication Data

US 2009/0143515 A1 Jun. 4, 2009

Related U.S. Application Data

(60) Provisional application No. 60/969,778, filed on Sep. 4, 2007.

(51) Int. Cl.
  *C01B 31/00* (2006.01)
  *C01B 31/04* (2006.01)
  *H01M 4/583* (2010.01)
  *C08K 3/04* (2006.01)

(52) U.S. Cl. ............... 428/408; 423/414; 423/415.1; 423/569; 423/448; 429/218.2; 429/231.8; 524/495

(58) Field of Classification Search ............... 428/34.1, 428/323, 324, 404; 524/495, 525, 496, 424; 252/500; 526/89; 429/218.2, 231.8; 423/448, 423/445, 414, 415.1
See application file for complete search history.

(56) References Cited

U.S. PATENT DOCUMENTS

| 3,549,560 | A | 12/1970 | Monsimer | |
|---|---|---|---|---|
| 2006/0019162 | A1* | 1/2006 | Shirahige et al. | 429/218.2 |
| 2007/0092432 | A1 | 4/2007 | Prud'homme et al. | |
| 2009/0053433 | A1* | 2/2009 | Prud'homme et al. | 428/34.1 |
| 2009/0054578 | A1* | 2/2009 | Prud'homme et al. | 524/424 |
| 2009/0054581 | A1* | 2/2009 | Prud'homme et al. | 524/495 |
| 2009/0127514 | A1* | 5/2009 | Korkut et al. | 252/500 |

OTHER PUBLICATIONS

Alonso et al. "Intercalation and Stitching of Graphite Oxide with Diaminoalkanes." Langmuir, pp. 10644-10649, Published on Web Sep. 7, 2007.*
Costas S. Triantafillidis, et al., "Thermoset Epoxy-Clay Nanocomposites: The Dual Role of α,ω-Diamines as Clay Surface Modifiers and Polymer Curing Agents", Elsevier Science, Journal of Solid State Chemistry 167, Sep. 1, 2002, pp. 354-362.
Margarita Herrera-Alonso, et al., "Intercalation and Stitching of Graphite Oxide With Diaminoalkanes", American Chemical Society, Langmuir 2007, 23, pp. 10644-10649.
William S. Hummers, Jr., et al., "Preparation of Graphitic Oxide", Contribution from the Bariod Division, National Lead Company, Preparation of Graphitic Oxide, 2957, p. 1339.
C. Hontoria-Lucas, et al., "Study of Oxygen-Containing Groups in a Series of Graphite Oxides: Physical and Chemical Characterization", Pergamon, Carbon vol. 33, No. 11, pp. 1585-1592, 1995.
Staudenmaier, L. Ber. Stsch. Chem. Ges. 1898, 31, 1481-1487.
M. Mermoux, et al., "FTIR and $^{13}$C NMR Study of Graphite Oxide", Carbon, vol. 29, No. 3, pp. 469-474, 1991.
Y. Matsuo, et al., "Preparation and Characterization of Cationic Surfactant-Intercalated Graphite Oxide", Carbon, vol. 37 (1999), pp. 897-901.
Y. Matsuo, et al., "Characterization of N-Hexadecylalkylamine-Intercalated Graphite Oxides as Sorbents", Carbon, vol. 41 (2003), pp. 1545-1550.
Y. Matsuo, et al., "Silylation of Graphite Oxide", Letters to the Editor, Carbon, vol. 42 (2004), pp. 2117-2119.
Anton Lerf, et al., "Structure of Graphite Oxide Revisited", J. Phys. Chem. B. 1998, 102, pp. 4477-4482.
Heyong He, et al., "Solid-State NMR Studies of the Structure of Graphite Oxide", J. Phys. Chem. 1996, 100, pp. 19954-19958.
Athanasios B. Bourlinos, et al., "Graphite Oxide: Chemical Reduction to Graphite and Surfaxe Modification With Primary Aliphatic Amines and Amino Acids", American Chemical Society, Langmuir 2003, 19, pp. 6050-6055.

* cited by examiner

*Primary Examiner*—Vasu Jagannathan
*Assistant Examiner*—Hannah Pak
(74) *Attorney, Agent, or Firm*—Oblon, Spivak, McClelland, Maier & Neustadt, L.L.P.

(57) ABSTRACT

Bridged graphite oxide material comprising graphite sheets bridged by at least one diamine bridging group. The bridged graphite oxide material may be incorporated in polymer composites or used in adsorption media.

19 Claims, 4 Drawing Sheets

BRIDGED GRAPHITE OXIDE MATERIALS

This invention was made with government support under Grant No. CMS0609049 awarded by the National Science Foundation and under Grant No. NCC-1-02037 awarded by NASA Langley Research Center. The government has certain rights in the invention.

FIELD OF THE INVENTION

The present invention relates to bridged graphite oxide compounds; a method for their preparation; and their uses, including polymer compositions containing the compounds.

BACKGROUND OF THE INVENTION

Layered materials such as nanoclays have increasingly been finding uses in such varied applications as fillers in polymer compositions, catalytic supports, selective adsorbents, molecular vessels, and the like. The properties of many layered materials can be adjusted by intercalating organic molecules in the gallery spacing between their layers. The use of appropriate intercalants can, for example, enhance the dispersability of a nanoclay in a polymer matrix and/or enhance the compatibility of a nanoclay with a particular polymer matrix. Graphite oxide is another layered material having the ability to expand unidimensionally along its c-axis during an intercalation process. However, some forms of intercalated graphite oxide can undergo substantial expansion and delamination in the c direction upon heating and/or have a tendency to collapse into a material having smaller spacings between the layers if the intercalants are removed. Additionally, when graphite oxide is used as a filler in polymer composites, excessive sliding of its component sheets can lead to poor physical properties. It would thus be desirable to have an intercalated graphite oxide material in which interlayer spacing distances could be tuned and in which the layered structure is less susceptible to delamination and sliding between its component sheets.

Graphite oxide intercalated with cationic surfactants is disclosed in Matsuo, Y.; Niwa, T.; Sugie, Y. *Carbon* 1999, 37, 897-901. Graphite oxide intercalated with n-hexadecylalkylamine is disclosed in Matsuo, Y.; Watanabe, K.; Fukutsuka, T.; Sugie, Y. *Carbon* 2003, 41, 1545-1550. Silylated graphite oxide is disclosed in Matsuo, Y.; Fukunaga, T.; Fukutsuka, T.; Sugie, Y. *Carbon* 2004, 42, 2113-2130. The surface modification of graphite oxide with neutral primary aliphatic amines and amino acids is disclosed in Bourlinos, A. B.; Gournis, D.; Petridis, D.; Szabó, T.; Szeri, A.; Dékány, I. *Langmuir* 2003, 19, 6050-6055. The use of derivatives of graphite oxide to study its structure is described in Lerf, A.; He, H.; Forster, M.; Klinowski, J. *J. Phys. Chem. B* 1998, 102, 4477-4482 and He, H.; Riedl, T.; Lerf, A.; Klinowski, J. *J. Phys. Chem.* 1996, 100, 19954-19958.

SUMMARY OF THE INVENTION

Disclosed and claimed herein is a bridged graphite oxide material, comprising at least two graphite oxide sheets in which a plurality of graphite oxide sheets are bridged to at least one other graphite oxide sheet by at least one diamine bridging group.

Further disclosed and claimed herein is a method for forming a bridged graphite oxide material comprising reacting at least two sheets of graphite oxide with at least one diamine such that one amino group of the diamine covalently reacts with a reactive group on one graphite oxide sheet and another amino group of the same diamine covalently reacts with a reactive group on another graphite oxide sheet.

Also disclosed and claimed herein is a polymer composite material comprising at least one polymer and a bridged graphite oxide material, wherein the bridged graphite oxide material comprises at least two graphite oxide sheets in which a plurality of graphite oxide sheets are bridged to at least one other graphite oxide sheet by at least one diamine bridging group.

DETAILED DESCRIPTION OF THE INVENTION

Figure 1:
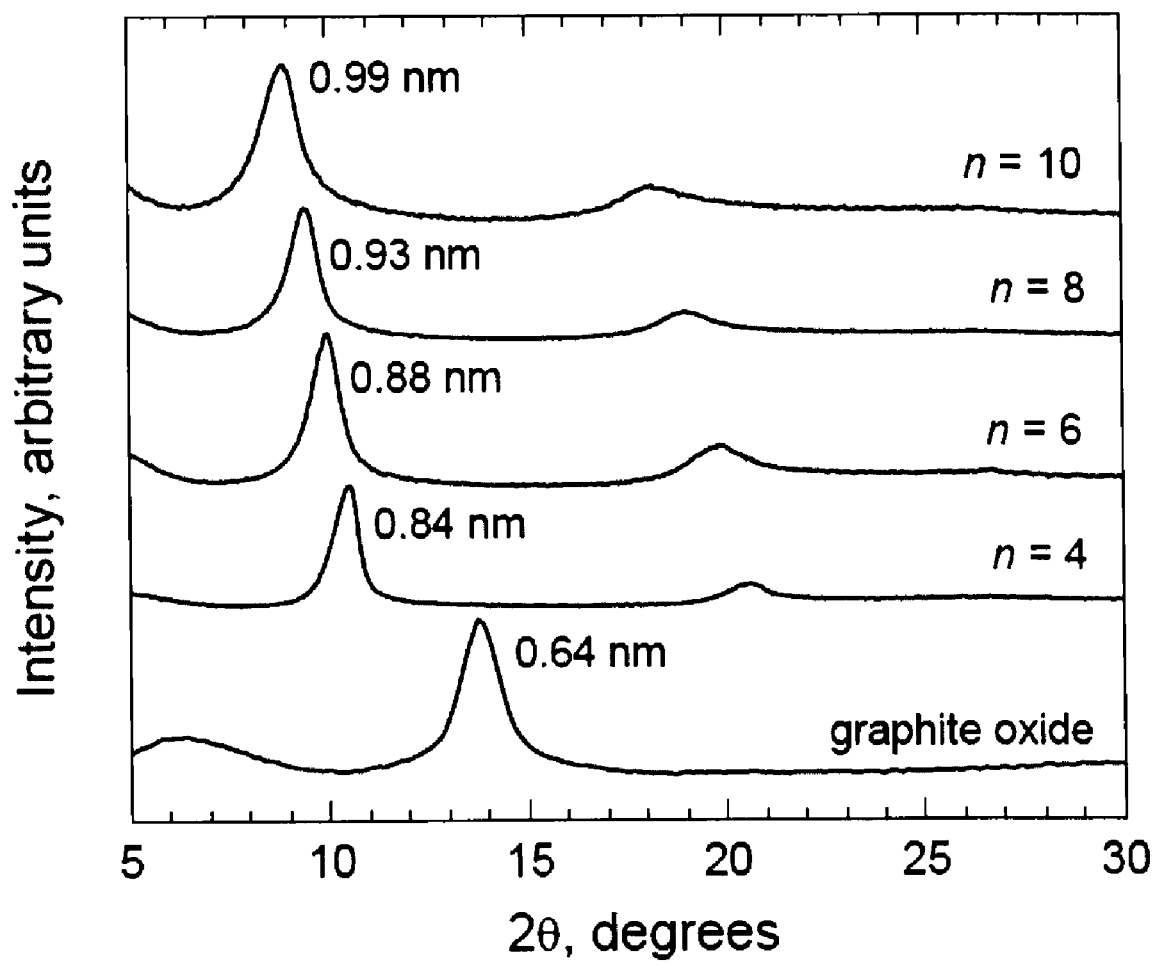
FIG. 1 is a graph of X-ray diffraction patterns of graphite oxide and graphite oxide bridged with 1,4-diaminobutane; 1,6-diaminohexane; 1,8-diaminooctane; and 1,10-diaminodecane.

Graphite oxide (GO) is an oxygen-rich derivative of graphite that comprises randomly distributed regions of unoxidized (e.g. aromatic) and oxidized aliphatic rings (e.g. six-membered rings). The oxidized regions may contain a variety of reactive oxygen-containing functional groups, including epoxides, hydroxyls, and carboxylic acids. Graphite oxide is further described in: Mermoux, M.; Chabre, Y.; Rousseau, A. *Carbon* 1991, 29, 469-474; and Hontoria-Lucas, C.; López-Peinado, A. J.; López-González, J. de D.; Rojas-Cervantes, M. L; Martín-Aranda, R. M. *Carbon* 1995, 33, 1585-1592. Syntheses of graphite oxide are described in Staudenmaier, L. *Ber. Dtsch. Chem. Ges.* 1898, 31, 1481-1487 and Hummers Jr., W. S.; Offerman, R. E. *J. Am. Chem. Soc.* 1958, 80, 1339-1340.

As used herein, the term "diamine" refers to an organic compound having at least two (and, optionally, more) amine groups.

The bridged graphite oxide of the present invention comprises at least two graphite oxide sheets (also referred to herein as "layers"). Each sheet corresponds to a single atomically thick sheet of graphite that has been oxidized. A plurality of the sheets are bridged to at least one other sheet by at least one diamine bridging compound. In one embodiment, at least one graphite oxide sheet is bridged to at least one other graphite oxide sheet by at least one diamine bridging group. In another embodiment, at least two graphite oxide sheets are bridged to at least one other graphite oxide sheet by at least one diamine bridging group.

The bridged graphite oxide is preferably in a pillared form in which the component sheets are stacked roughly parallel to each other along the c-axis and preferably substantially overlap each other. In another embodiment of the invention, the component sheets may be in a non-pillared form in which they are roughly parallel to, but only partially overlap each other.

The bridged graphite oxide is formed by the covalent reaction of one amino group of a diamine with a reactive group on the surface or edge of one graphite oxide sheet and the covalent reaction of another amino group of the same diamine with a reactive group on the surface or edge of another graphite oxide sheet. The segment of the reaction product derived from the diamine is referred to as the "diamine bridging group." The reactive groups are preferably oxygen-containing groups such as epoxides and carboxylic acids. Two graphite oxide sheets may be bridged to each other by more than one diamine bridging group. Each graphite oxide sheet may also be bridged to two or more other sheets by one or more diamine bridging groups.

Any suitable primary diamines can be used to form the bridged graphite oxide, including aliphatic, alicyclic, and aromatic diamines. The diamines are preferably aliphatic diamines, and more preferably $\alpha,\omega$-diaminoalkanes having the general formula $H_2N(CH_2)_nNH_2$, in which n is preferably an integer of 3-20, or more preferably an integer of 4-14, inclusive. Alicylic diamines include diaminocyclohexanes and aromatic diamines include diaminobenzenes, xylyenediamines, diaminonaphthalenes, and the like. Two or more diamines may also be used to form the bridged graphite oxide.

The interlayer-spacing in the bridged graphite oxide may be tailored by the choice of diamine(s) used.

The reaction of diamines with graphite oxide may be carried out under any suitable conditions. For example, the graphite oxide may be dispersed or suspended in a solvent and combined with diamine in solution or in neat form. The reaction may take place at any appropriate temperatures, including room temperature or at elevated temperatures. Preferred solvents include alcohols (e.g. ethanol) and mixtures of alcohols and water. In one embodiment of the invention, the resulting bridged graphite compound is at least partially chemical reduced (i.e., at least a portion of the oxygen has been removed from the graphitic layers). Reduction may be achieved by, for example, carrying out the reaction of diamine with graphite oxide at elevated temperatures for an extended period of time. (For example, the graphite oxide may be refluxed with diamine or another amine.) Alternatively or additionally, reduction of the bridged graphite oxide may be carried out after the initial bridging reaction by use of additional reducing agents The bridged graphite oxide can be less susceptible to swelling and/or exfoliation than non-bridged graphite oxides, including graphite oxides treated with monoamines.

The bridged graphite oxide of the present invention may be used as a filler in polymer composites. The matrix polymer(s) may be thermoplastic or thermosetting polymers. Examples of polymers include ABS (acrylonitrile/butadiene/styrene polymers); polyolefins (including polyethylene and polypropylene); polyesters (aromatic and aliphatic and poly(lactic acid) and poly(hydroxyalkanoates); polyamides (including aliphatic, semiaromatic (e.g. polyphthalamides), and aromatic polyamides); polyamide-imides; liquid crystalline polymers; polystyrenes (including high impact polystyrene); polycarbonates; fluoropolymers (including PTFE, FEP, PFA, CTFE, ECTFE, and ETFE); poly(vinyl acetate); ethylene/vinyl acetate polymers; ethylene/vinyl alcohol polymers; poly(vinyl chloride) (PVC); poly(vinylidene chloride); acrylic polymers, including methacrylate and acrylate polymers; polyacrylonitriles; ionomers, polyimides; polysulphones; polyacetals; polyetheretherketones (PEEK); polyetherimides (PEI); polyethersulfones (PES); poly(phenylene sulfide) (PES); liquid crystalline polymers; acrylonitrile/butadiene/styrene polymers; epoxies; polyurethanes; phenol/formaldehyde resins; melamine resins; and the like.

The polymer composites may be formed using any method known in the art and may contain additional components. Articles may be prepared from the resulting composite using any method known in the art, including injection molding, extrusion, reactive injection molding, calendaring, compression molding, blow molding, injection blow molding, spin casting, etc.

The bridged graphite oxide of the present invention may also be used as an adsorption material, such as a hydrogen storage medium in a hydrogen storage device or as a component in an adsorption unit. The interlayer spacing of the bridged graphite oxide may be selected such that it is a selective adsorbent for one or more members of a multicomponent mixture.

Having generally described this invention, a further understanding can be obtained by reference to certain specific examples which are provided herein for purposes of illustration only, and are not intended to be limiting unless otherwise specified.

EXAMPLES

Materials

All materials were used as received. Natural flake graphite particles (40 μm particle size) were provided by Asbury Carbon, New Jersey. Sulfuric acid (98%), hydrochloric acid (37%), and nitric acid (fuming, 90%) were purchased from Fisher. Potassium chlorate, ethanol (reagent grade), diaminoalkanes, and alkylamines were obtained from Aldrich.

Characterization

X-ray diffraction (XRD) patterns were acquired on a Rigaku MiniFlex diffractometer with Cu Kα radiation.

Simultaneous thermogravimetric analysis (TGA) and differential scanning calorimetry (DSC) experiments were conducted with a Nezstch STA 449C thermal analyzer. Analyses were done under a nitrogen atmosphere (50 mL/min flow rate) at a heating rate of 1° C./min.

Preparation of Graphite Oxide

Graphite oxide was synthesized from natural flake graphite particles (40 μm particle size) by the method described in Staudenmaier, L. *Ber. Dtsch. Chem. Ges.* 1898, 31, 1481-1487. Sulfuric acid (160 mL) and nitric acid (90 mL) were added to a roundbottom flask containing a stirring bar, and cooled with an ice bath for 1 h. Graphite particles (10 g) were added to the acids mixture under vigorous stirring and the suspension was cooled for 20 min. Potassium chlorate (110 g) was slowly added over 15 min, while keeping the reaction vessel inside an ice bath and ensuring that the reaction temperature did not exceed 35° C. Oxidation was allowed to proceed for 96 h. The suspension was washed with an aqueous hydrochloric acid solution (10 vol. %) to remove the sulfate ions and then washed repeatedly with deionized (DI) water until a neutral pH was reached. The final concentration of GO in the suspension was approximately 6 mg GO/mL.

Intercalation of Graphite Oxide with Mono- and Difunctional Amines

In a typical experiment, a diaminoalkane or alkylamine (600 mg) is dissolved in ethanol (35 mL) and added dropwise to a suspension of GO in water (200 mg GO, 33 mL water) under vigorous stirring. The reaction is continued for 24 h at room temperature or under reflux (78° C.). Intercalated GO is isolated by centrifugation and thoroughly washed with 1:1

(vol/vol) ethanol:water (45 mL, 4×), filtered, and dried at 80° C. under vacuum for a minimum of 12 h prior to characterization.

Example 1

Graphite oxide was intercalated with 1,4-diaminobutane; 1,6-diaminohexane; 1,8-diaminooctane; and 1,10-diaminodecane. X-ray diffraction patterns of the resulting intercalation compounds and GO oxide were obtained and are shown in FIG. 1., where "n" refers to the number of methylene units present in the diamine according to the formula $H_2N(CH_2)_nNH_2$. The interlayer spacing of the materials as calculated from the diffraction pattern are indicated next to the major peak for each sample and are given in Table 1.

TABLE 1

| Intercalant | Interlayer spacing (nm) |
| --- | --- |
| None | 0.64 |
| 1,4-diaminobutane | 0.84 |
| 1,6-diaminohexane | 0.88 |
| 1,8-diaminooctane | 0.93 |
| 1,10-diaminodecane | 0.99 |

Example 2

Figure 2:
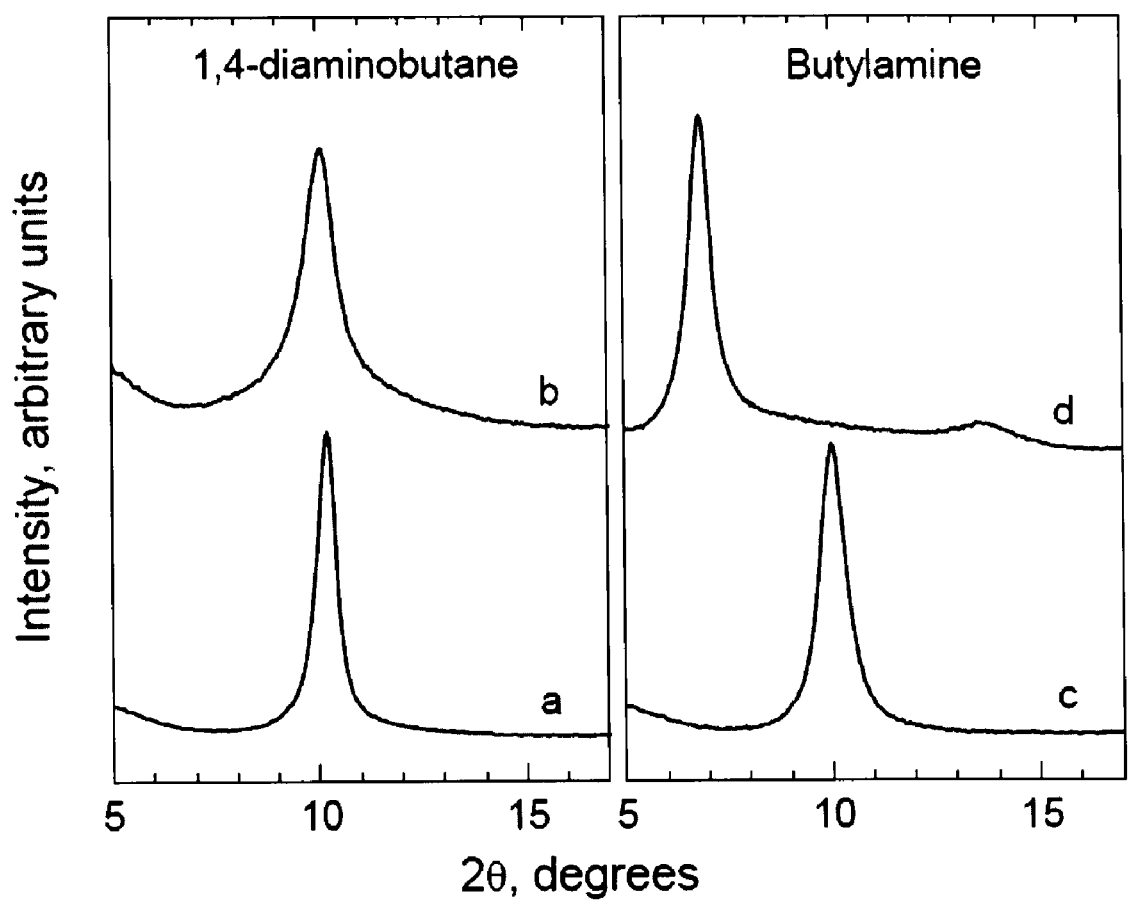
FIG. 2 is a graph of X-ray diffraction patterns of intercalation compounds of graphite oxide with 1,4-diaminobutane and n-butylamine, before and after further treatment with dodecylamine.

Graphite oxide was intercalated with 1,4-diaminobutane and n-butylamine. The resulting intercalation compounds were further treated with n-dodecylamine following the same procedure. X-ray diffraction patterns of the intercalation compounds were obtained before and after treatment with n-dodecylamine. In the case of the 1,4-diaminobutane, no significant change in the interlayer spacing was observed. In the case of n-butylamine, however, the interlayer spacing increased from about 0.85 nm to about 1.4 nm, indicating that cross-linking in the first case prevented the swelling that occurred in the second case. The X-ray diffraction patterns are shown in FIG. 2, where traces (a) and (b) correspond to the intercalation compound of 1,4-diaminobutane before and after treatment with n-dodecylamine, respectively, and where traces (c) and (d) correspond to the intercalation compound of n-butylamine before and after treatment with n-dodecylamine, respectively.

Example 3

Figure 3:
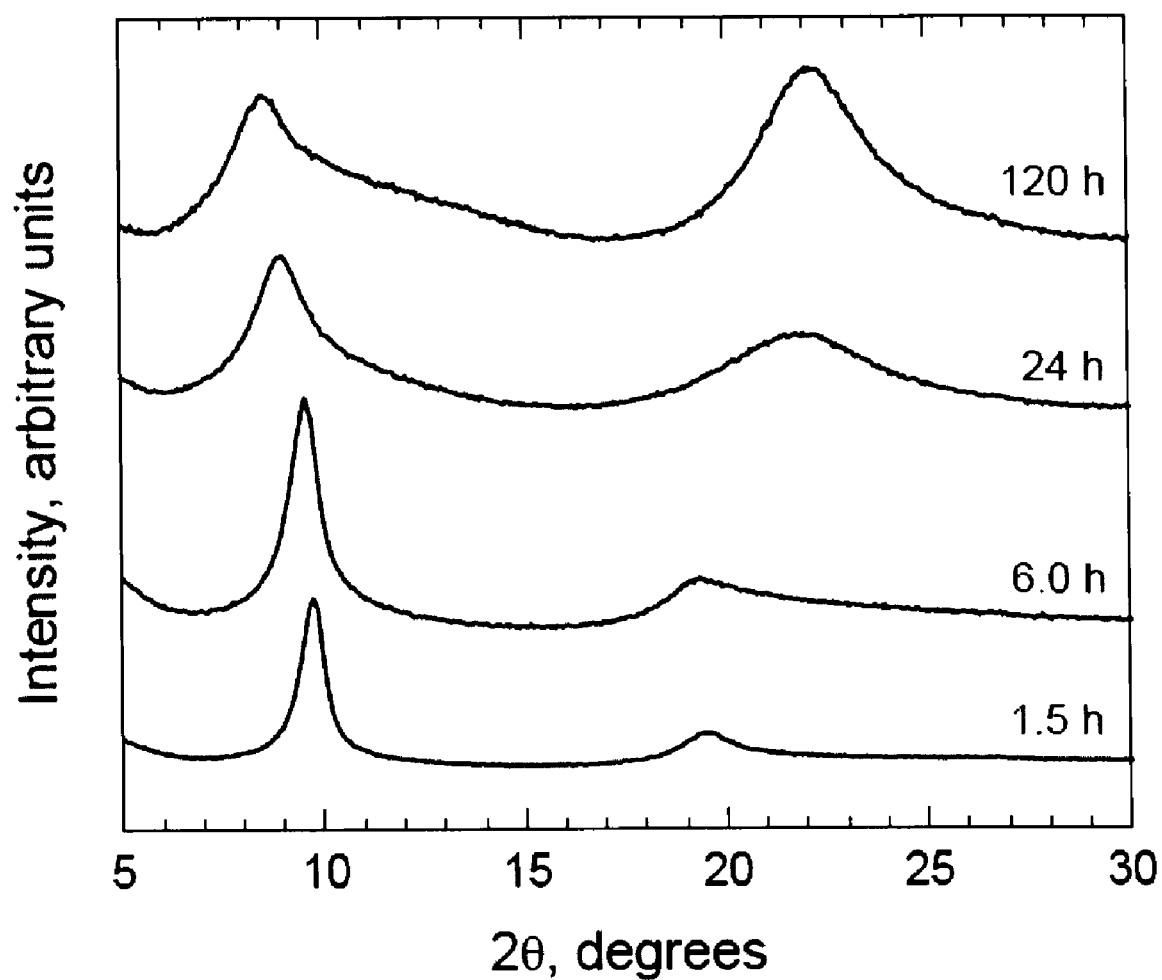
FIG. 3 is a graph of X-ray diffraction patterns of intercalation compounds of graphite oxide with 1,8-diaminoocatane prepared at different reaction times.

Graphite oxide was intercalated with 1,8-diaminooctane following the procedure given above, except that samples were refluxed for 1.5, 6, 24, and 120 hours. FIG. 3 shows the X-ray diffraction pattern for the four resulting intercalation compounds. The broad peak observed at 2θ=ca. 20.5-23° corresponds to an average interlayer spacing of about 0.4 nm, and is believed to be from disordered graphitic platelets, demonstrating that chemical reduction of graphite oxide has taken place.

Example 4

The thermal behavior of the following materials was studied by DSC and TGA:

(a) graphite, (b) graphite oxide, (c) graphite oxide intercalated with n-octylamine, (d) graphite oxide intercalated with 1,8-diaminooctane at room temperature, and (e) graphite oxide intercalated with 1,8-diaminooctane under reflux.

Figure 4:
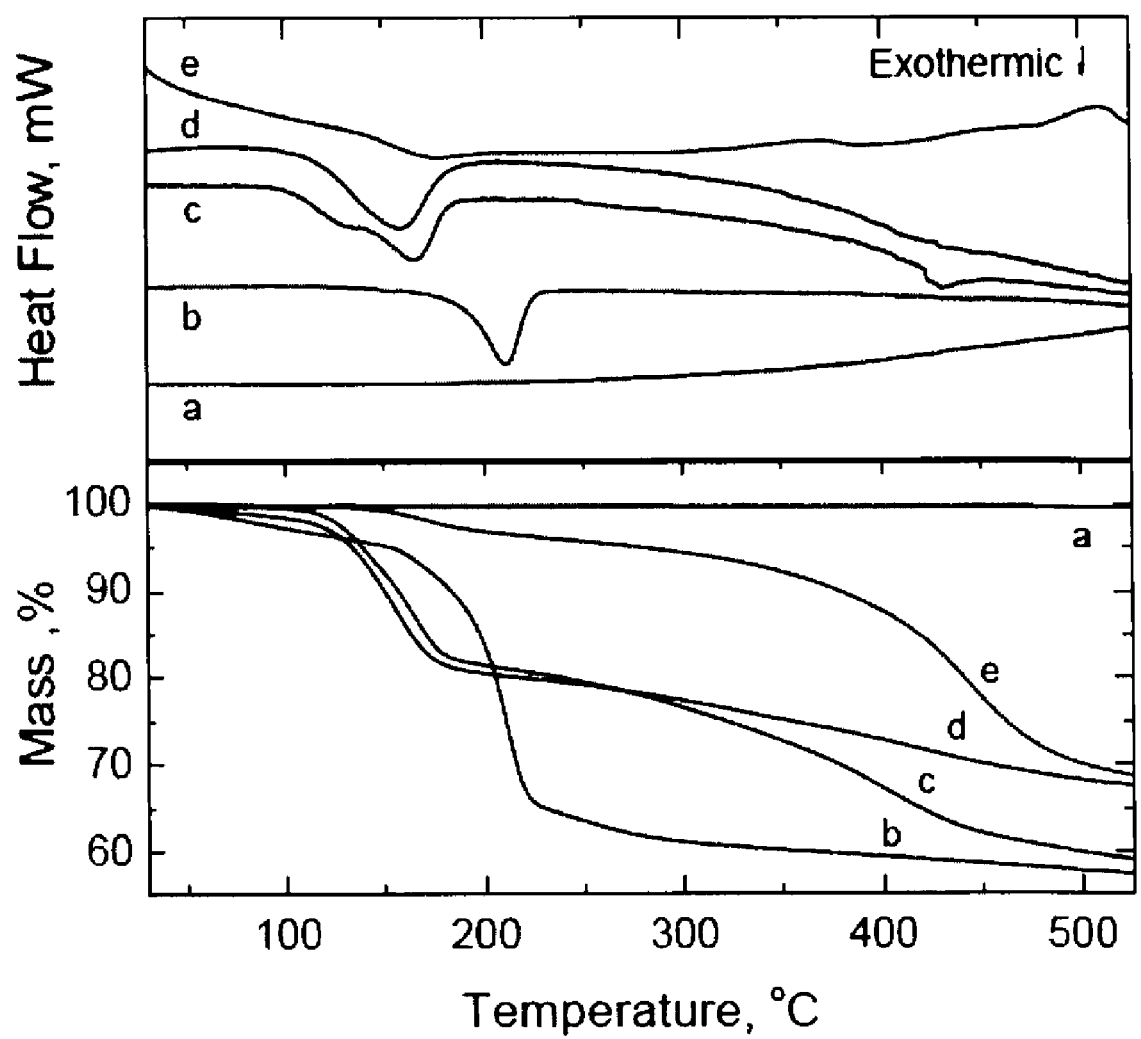
FIG. 4 is a graph of TGA and DCS thermograms of graphite (a), graphite oxide (b), graphite oxide intercalated with n-octylamine (c), graphite oxide intercalated with 1,8-diaminooctane at room temperature (d), and graphite oxide intercalated with 1,8-diaminooctane at room temperature (e).

The results are shown in FIG. 4, where the top thermograms show the DSC experiments and the bottom thermograms show the TGA experiments.

Graphite oxide (b), being hydrophilic because of its high concentration of polar functional groups, exhibits two regions of mass loss. The first occurs at temperatures below about 125° C. and is attributed to loss of adsorbed water (~4%). The second occurs at an onset temperature of about 150° C. and is associated with the thermal decomposition of oxygen-containing functionalities to generate carbon dioxide and water. The corresponding DSC trace shows a large exothermic signal with a peak at about 210° C. The curve slowly plateaus at around 300° C., with a total mass loss of about 44%.

Graphite oxide intercalated with n-octylamine (c) and 1,8-diaminooctane (d) also exhibits loss of oxygen-containing functionalities at about 125° C., which accounts for approximately 18% of the total mass. It is unlikely that the n-octylamine or 1,8-diaminooctane would decompose within this temperature range since their boiling temperatures are 175 and 226° C., respectively. The decreased mass loss within the temperature range of about 125 to 210° C. for the intercalated derivatives, compared to graphite oxide alone, is attributed to loss or transformation of some oxygen-containing groups either by reaction with amines (ring-opening of epoxides) or by chemical reduction. Decomposition of the intercalants occurs between about 300 and 475° C. and is accompanied by an exothermic DSC signal at about 425° C. that is more clearly observed for n-octylamine intercalation compound (c).

The thermograms of graphite intercalated with 1,8-diaminooctane under reflux (e) are very different from those of compounds (b), (c), and (d). A negligible mass loss was observed below 210° C. (~5%), indicating that intercalation compound (e) was a reduced graphite oxide.

U.S. provisional patent application 60/969,778 filed Sep. 4, 2008, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A bridged graphite oxide material comprising: at least two graphite oxide sheets in which a plurality of graphite oxide sheets are bridged to at least one other graphite oxide sheet by at least one diamine bridging group.

2. The bridged graphite oxide material of claim 1, wherein the diamine bridging group is derived from at least one α,ω-diaminoalkane.

3. The bridged graphite oxide material of claim 2, wherein the α,ω-diaminoalkane is at least one diamine having the general formula $H_2N(CH_2)_nNH_2$, wherein n is an integer of 4 to 14.

4. The bridged graphite oxide material of claim 1, which is at least partially reduced.

5. A method for forming a bridged graphite oxide material comprising: reacting at least two sheets of graphite oxide with at least one diamine such that one amino group of said diamine covalently reacts with a reactive group on one graphite oxide sheet and another amino group of said diamine covalently reacts with a reactive group on another graphite oxide sheet.

6. The method of claim 5, wherein the diamine is at least one α,ω-diaminoalkane.

7. The method of claim 6, wherein the diamine has the general formula $H_2N(CH_2)_nNH_2$, wherein n is an integer of 4 to 14, inclusive.

8. The method of claim 5, further comprising:
at least partially reducing the bridged graphite oxide material.

9. A polymer composite material comprising: at least one polymer; and a bridged graphite oxide material; wherein the bridged graphite oxide material comprises at least two graphite oxide sheets in which a plurality of graphite oxide sheets are bridged to at least one other graphite oxide sheet by at least one diamine bridging group.

10. The composite material of claim 9, wherein the diamine bridging group is derived from at least one α,ω-diaminoalkane.

11. The composite material of claim 10, wherein the α,ω-diaminoalkane is at least one diamine having the general formula $H_2N(CH_2)_nNH_2$, wherein n is an integer of 4 to 14.

12. The composite material of claim 9, wherein the bridged graphite oxide material is at least partially reduced.

13. The composite material of claim 9, wherein the polymer is at least one thermoplastic polymer.

14. An article comprising: the composite material of claim 9.

15. A selective adsorption medium comprising: the bridged graphite oxide material of claim 1.

16. An adsorption device comprising: the selective adsorption medium of claim 15.

17. A hydrogen storage medium comprising: the bridged graphite oxide material of claim 1.

18. A hydrogen storage device comprising: the hydrogen storage medium of claim 17.

19. The method of claim 5, further comprising:
fully reducing the bridged graphite oxide material.

* * * * *